(12) United States Patent
Chen et al.

(10) Patent No.: US 6,393,191 B1
(45) Date of Patent: May 21, 2002

(54) OPTICAL TERMINAL FOR OPTICAL FIBERS WITH OUTPUT ANGLE CONTROL

(75) Inventors: Junbo Chen, Milpitas; Vincent Au-Yeung, Los Altos; Qingdong Guo, Sunnyvale, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/285,952

(22) Filed: Apr. 1, 1999

(51) Int. Cl.$^7$ ................................................ G02B 6/00
(52) U.S. Cl. ............................ 385/139; 385/34; 385/68; 385/74; 385/84
(58) Field of Search .......................... 385/139, 84, 34, 385/68, 74

(56) References Cited

U.S. PATENT DOCUMENTS

| | | | |
|---|---|---|---|
| 4,698,084 A | * 10/1987 | Severijns et al. | 65/3.11 |
| 4,773,924 A | * 9/1988 | Berkey | 65/3.11 |
| 5,138,677 A | * 8/1992 | O'Shaughnessy et al. | 385/43 |
| 5,355,426 A | * 10/1994 | Daniel et al. | 385/39 |
| 5,612,824 A | 3/1997 | Si et al. | 359/652 |
| 5,652,814 A | 7/1997 | Pan et al. | 385/24 |
| 5,799,121 A | 8/1998 | Duke et al. | 385/47 |
| 5,857,048 A | 1/1999 | Feuer et al. | 385/88 |

* cited by examiner

*Primary Examiner*—Frank G. Font
*Assistant Examiner*—Michael P. Mooney
(74) *Attorney, Agent, or Firm*—Lumen Intellectual Property Services

(57) ABSTRACT

An optical terminal using a capillary with a central opening or a bore of a selected cross section and having an insertion opening and a coupling opening. The optical terminal has a light-guiding element, e.g., a lens, positioned in front of the coupling opening. Optical fibers having adjusted cross sections along a fitting length are inserted into the bore such that they are wedged inside it, their tips are positioned at the coupling opening and their cores are offset by a specific distance or offset from the optical axis of the light guiding element. A number of fibers including optical and reinforcement fibers can be wedged in the bore in this manner to ensure a specific offset between the cores of the optical fibers and the optical axis. Precise control of the offset between the cores and the optical axis permits one to accurately control an output angle of light beams issuing from the optical fibers and exiting the optical terminal through the light guiding element.

22 Claims, 5 Drawing Sheets

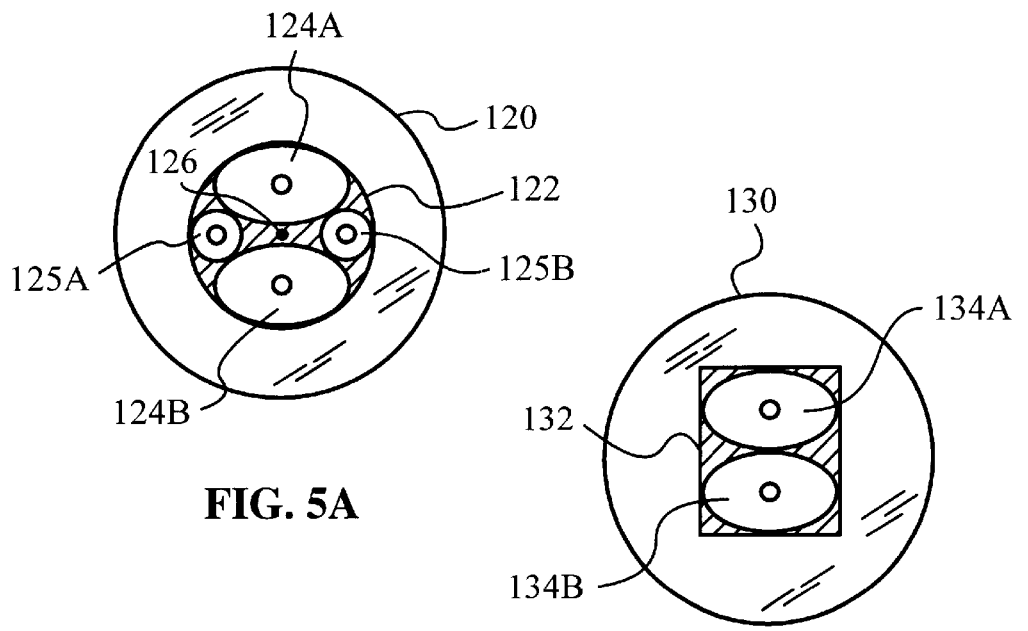
FIG. 5A
FIG. 5B
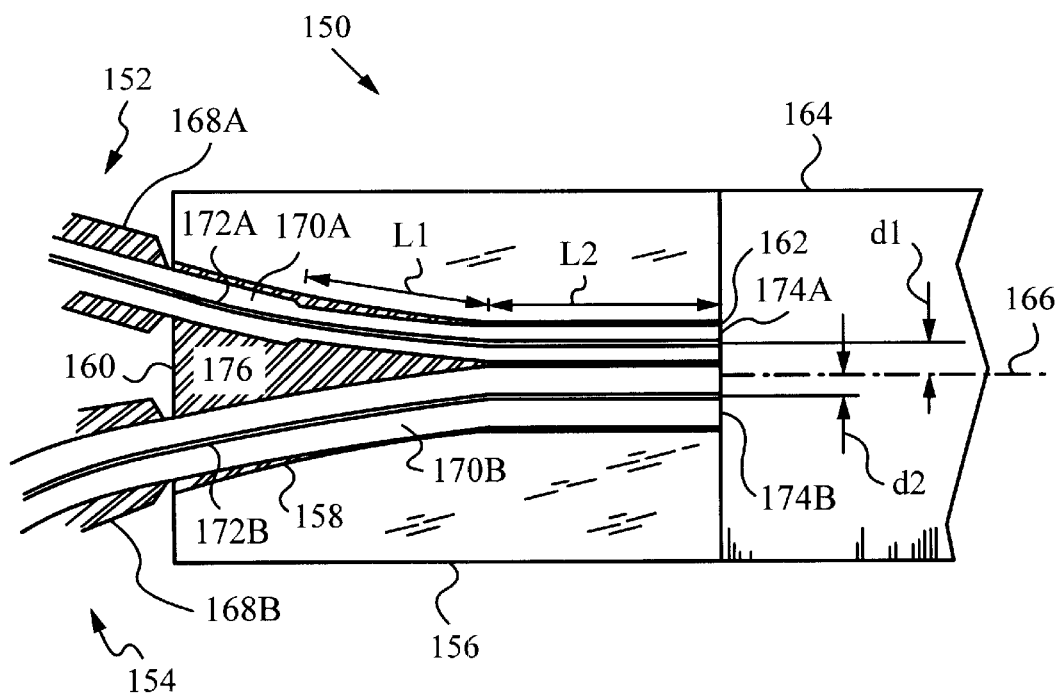
FIG. 6

OPTICAL TERMINAL FOR OPTICAL FIBERS WITH OUTPUT ANGLE CONTROL

FIELD OF THE INVENTION

This invention relates to the field of optical terminals for receiving optical fibers, and in particular to terminals affording precise control of the exit or output angle of a light beam issuing from an optical fiber.

BACKGROUND OF THE INVENTION

The out-coupling of a light beam from a fiber at a very precise exit or output angle remains one of the many challenges encountered in the field of fiber optics. Specifically, a light beam traveling through a fiber, e.g., a signal beam, has to be out-coupled for purposes of optical and/or electronic processing. For example, a signal beam may have to be out-coupled and filtered to ensure passage of a particular wavelength, and then converted into an electronic signal for data retrieval and computing purposes. Such situation may arise in the field of fiber optic communications, e.g., in Wavelength-Division-Multiplexed (WDM) networks in which a fiber carries a number of signals at a predetermined set of wavelengths.

Many different types of optical fibers are known and used in fiber optics. A typical fiber has three major components. The first is a waveguide or core, which has a high refractive index. The core is surrounded by a lower index cladding layer which protects the core and prevents light from leaking out. A jacket or reinforcement layer surrounds the cladding layer to protect the optical fiber from external influences and/or to provide additional mechanical support.

When out-coupling a light beam from the core of the fiber, the output angle is very important because it determines the angle at which the light beam is incident on the subsequent optical or electronic component. For example, in the case of a wavelength filter, the angle of incidence will affect the center wavelength transmitted by the filter. In other cases, e.g., where the out-coupled light is to be in-coupled into another fiber, control of the output angle is essential to ensure proper in-coupling and low insertion losses.

A narrow band filter operating on light transmitted between two optical fibers can be made according to a method taught by Si et al. in U.S. Pat. No. 5,612,824. In this invention the filter is sandwiched between two graded index (GRIN) lenses which preferably share the same optical axis. The input and output fibers are positioned at corresponding input and output ports which are initially equidistant from the optical axis by the same amount. Consequently, the light out-coupled from the input fiber passes through the first GRIN lens, is filtered by the filter, and then passes through the second GRIN lens to the output fiber. A shift in the angle at which the light is incident on the filter is achieved by altering the distance of the input port from the optical axis. A corresponding adjustment of the output port is required to ensure proper in-coupling of the filtered light.

In U.S. Pat. No. 5,799,121 inventors Duck et al. teach a multi-port optical device related to the one taught by Si et al. In the device of Duck et al. the output angle of light emitted from an optical fiber and reflected by a filter into a second optical fiber is adjusted by moving the input and output ports. In particular, the distance between the ports and the optical axis of the GRIN lens is varied to obtain angle tuning.

Neither Si et al. nor Duck et al. teach or suggest a suitable method for adjusting the offset distance of the ports from the optical axis to achieve precise tuning of the angle at which the light is incident on the filter. Furthermore, they do not discuss a suitable mechanism for properly holding the fibers at the ports.

Feuer et al. in U.S. Pat. No. 5,857,048 teach a photonics package which can be used in optical communications networks. The signals can be guided by separate fibers. Precise positioning of the fibers with respect to the optical axis of the optical element of the package is achieved by using a dual-fiber ferrule which has a separate bore for each fiber. Alternatively, fibers can be placed in the same bore in a tight fit. This method of adjusting the offset distance of the fibers from the optical axis is contingent on the dimensions of the bore and the standardized diameters of the fibers. Hence, the method is not sufficiently flexible for precise determination of the offset distances.

Another fiber-optic coupler as well as devices and systems incorporating this coupler is presented by Pan et al. in U.S. Pat. No. 5,652,814. Pan et al. suggest that fibers should be placed in a central opening or bore of a sleeve or capillary and that the cladding layers may be used to maintain a distance between the cores. A lensing element, such as a GRIN lens, is positioned in front of the central opening. The cores of the fibers are parallel to and slightly offset from an optical axis of the GRIN lens. Thus, the beams issuing from the fibers exit the GRIN lens at certain angles. The claddings of both fibers can be tapered.

The method of arranging fibers in the sleeve as taught by Pan et al. does not allow one to achieve very precise determination of the offset distance from the optical axis. Hence, very precise control of the output angle from the coupler's GRIN lens is not ensured. Moreover, the method does not allow a designer to alter the output angles in an easy and straightforward manner.

OBJECTS AND ADVANTAGES OF THE INVENTION

In light of the above, it is a primary object of the present invention to provide an optical terminal which overcomes the prior art limitations and enables very precise control of the offset distance between a fiber core and an optical axis of a light-guiding element, such as a GRIN lens. This precise control of the offset distance ensures very precise control of the output angle of the light emitted from the fiber core and transmitted through the light-guiding element.

It is another object of the invention to provide a method for placing fibers in an optical terminal at a very precisely defined distance from the optical axis of the light guiding element.

Yet another object of the invention is to ensure that the optical terminal of the invention and the method of placing fibers therein are easy and straightforward to implement.

The above objects and advantages, as well as numerous additional improvements attained by the heterodyne detection system of the invention are pointed out below.

SUMMARY OF THE INVENTION

The objects and advantages of the invention are attained by an optical terminal having a capillary with a central opening or a bore. The bore has an insertion opening and a coupling opening. Preferably, the insertion opening is larger than the coupling opening. A light-guiding element having an optical axis is positioned in front of the coupling opening. The light-guiding element may be joined or bonded to the capillary, if required.

A first optical fiber with a first tip, a first core for conducting a light beam and a first cladding surrounding the core is placed in the bore such that the first tip is positioned at the coupling opening. The first optical fiber has a first fitting length along which a portion of the cladding is removed to produce a first adjusted cross section.

A second fiber having a second fitting length and a second adjusted cross section different from the first adjusted cross section is also placed in the bore. The second fiber is used to wedge the first fitting length of the first optical fiber in the bore such that the first core at the first tip is maintained at a first distance from the optical axis of the light-guiding element.

Preferably, the bore's insertion opening is larger than the coupling opening. The cross section of the coupling opening may differ, e.g., it may be circular, rectangular, rhombic or other. Also, the adjusted cross sections of the first and second fibers are preferably circular.

The light-guiding element may be any suitable type of waveguide or lens. In most applications a graded index (GRIN) lens is used. Other lenses such as ball lenses or micro-drum lenses can also be used.

The second fiber does not have to be an optical fiber. For example, the second fiber can be a reinforcing fiber which serves to wedge the first fiber's fitting length only. Alternatively, the second fiber can be an optical fiber and have a second core, a second cladding and its second adjusted cross section can extend along the second fitting length. In this situation, the second fiber has a second tip. The second tip is positioned at the coupling opening such that the second fitting length is wedged in the bore and the second core at the tip is maintained at a second distance from the optical axis. The first and second fitting lengths can be equal.

The bore of the optical terminal is preferably filled with an epoxy. The epoxy enters and fills the regions between the bore and the first and second fibers.

Of course, more than two fibers can be inserted into the bore and wedged to ensure a predetermined distance between their cores and the optical axis. Some of those fibers can be optical fibers and some reinforcing fibers, as necessary.

In accordance with the method of the invention an output angle of a light beam from the first tip of the first optical fiber is controlled by accurately setting the first distance from the optical axis. This is ensured by using removing the cladding in the fitting lengths in a controlled manner. The preferred method for accomplishing controlled removal of the cladding is by etching. A uniform etching process ensures uniform removal of the cladding and hence the adjusted cross section in this case is circular.

In order to prevent light leakage from the core and not compromise the mechanical stability of the fiber it is important not to etch the cladding closer than four times the radius of the core.

Further details of the invention are found below in the description with reference to the attached drawing figures.

DESCRIPTION OF THE FIGURES

FIGS. 5A–B are diagrams illustrating different arrangements of fibers having non-circular cross sections in the coupling openings of different bores according to the invention.

FIG. 6 is cross sectional side view of a portion of an optical terminal for holding two fibers.

DETAILED DESCRIPTION

Figure 1:
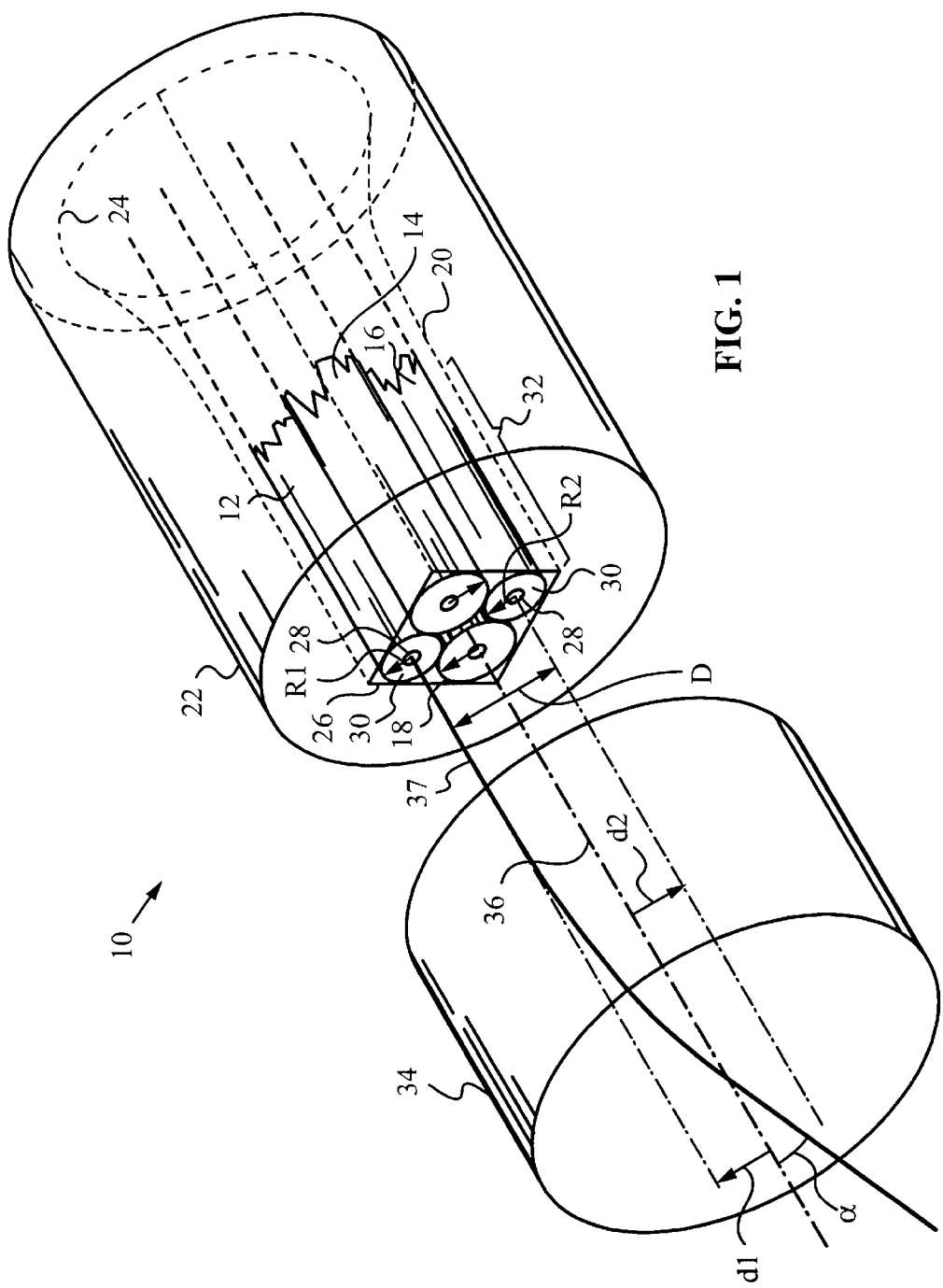
FIG. 1 is an isometric exploded view of an optical terminal according to the invention.

FIG. 1 illustrates an embodiment of an optical terminal 10 according to the invention. Terminal 10 is designed to accommodate four optical fibers 12, 14, 16 and 18 in a bore 20 of a capillary 22. Bore 20 has an insertion opening 24 at the back of capillary 22. At the front of capillary 22 bore 20 ends with a square coupling opening 26.

Insertion opening 24 is circular while coupling opening 26 has a square cross section. Also, insertion opening 24 is larger than coupling opening 26. This is not necessary, but is preferable since it enables easier assembly of optical terminal 10. Specifically, a larger insertion opening 24 makes it easier to insert optical fibers 12, 14, 16 and 18 into bore 20.

Optical fibers 12, 14, 16 and 18 each have a core 28, and a cladding layer or cladding 30 surrounding core 28. For clarity, core 28 and cladding 30 are only indicated in optical fibers 12 and 16. The radii of optical fibers 12, 14, 16 and 18 from the core center to the cladding surface are indicated by arrows. Again, for clarity only the radii of fibers 12 and 16 have been specifically designated by R1 and R2 respectively.

The radius of each of the optical fibers 12, 14, 16 and 18 is set by adjusting the thickness of cladding 30, as described in detail below. The radii of optical fibers 12 are adjusted such that each one of them is firmly wedged into bore 20. Any jacket or other external protection layer is removed in the portion of optical fibers 12, 14, 16 and 18 wedged in a front portion 32 of bore 20. In particular, front portion 32 corresponds to a fitting length which is equal for each one of optical fibers 12, 14, 16 and 18.

A light-guiding element 34 is located in front of coupling opening 26. In this embodiment element 34 is a graded index (GRIN) lens whose optical axis 36 is aligned with the center of bore 20. Of course, element 34 can be replaced by a different lensing element such as a ball lens or a micro-drum lens. A person of average skill in the art will be able to determine the most suitable lens in any given situation.

A distance D between cores 28 of fibers 12 and 16 is indicated. Fiber 12 is offset from optical axis 36 by a first distance d1 and fiber 16 is offset from optical axis 36 by a second distance d2. Distances d1 and d2 are determined by the radii of fibers 12, 14, 16 and 18, as described below.

A light beam 37 emitted from core 28 of optical fiber 12 enters GRIN lens 34 and exits at an output angle α. Output angle α is a function of first distance d1. Likewise, output angles of light beams (not shown) emitted from the remaining fibers 14, 16 and 18 are also determined by their offsets or distances from optical axis 36.

Figure 2:
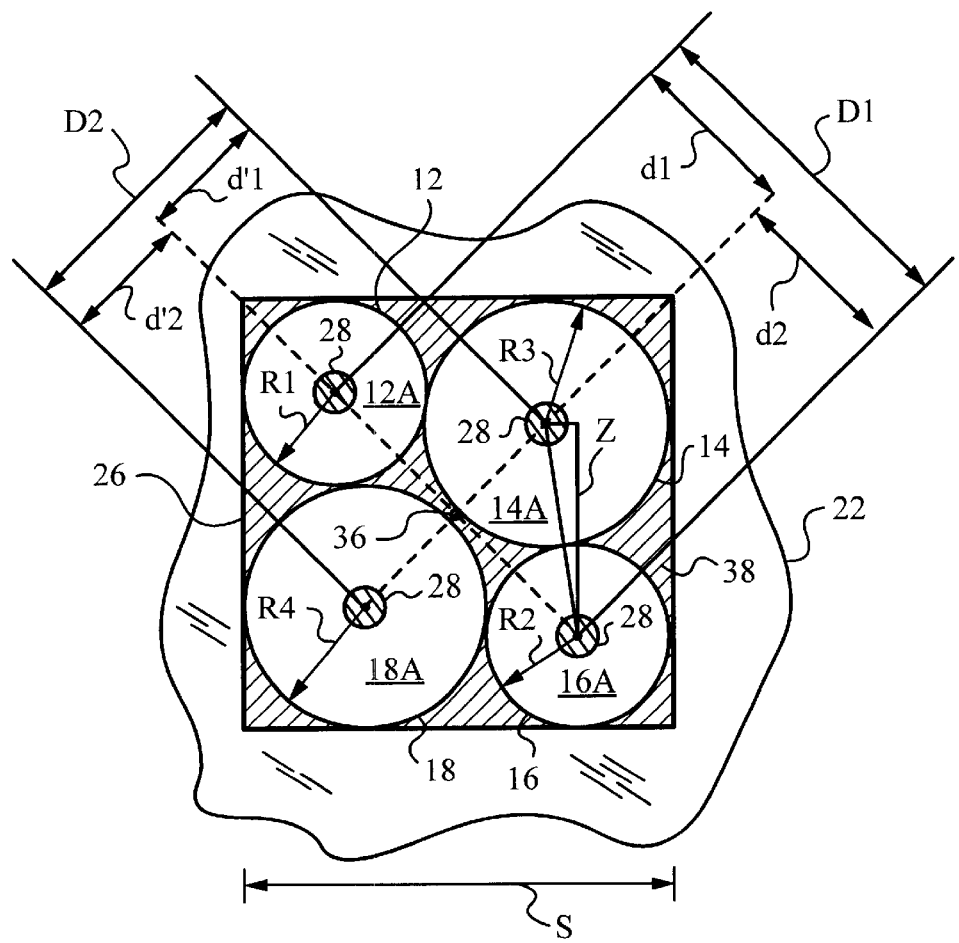
FIG. 2 is a cross sectional front view showing the coupling opening of the bore of the optical terminal of FIG. 1.

We now refer to the cross sectional front view of FIG. 2 which shows the front of capillary 22 and the arrangement of fibers 12, 14, 16 and 18 within coupling opening 26. Specifically, only tips 12A, 14A, 16A and 18A of fibers 12, 14, 16 and 18 are seen in this view. The radii R1, R2, R3 and R4 of fibers 12, 14, 16 and 18 at tips 12A, 14A, 16A and 18A are indicated.

In accordance with the invention, each fiber 12, 14, 16 and 18 has an adjusted cross section along fitting length 32. In this embodiment the adjusted cross sections are all circular and radii R1, R2, R3 and R4 are constant along the fitting length 32 for all fibers 12, 14, 16 and 18. Given the length of the sides and the geometry of the coupling opening the adjusted cross sections, or in this case radii R1, R2, R3 and R4 are chosen such that specific distances between optical axis 36 and the core 28 of each fiber 12, 14, 16 and 18 is maintained.

Adjustment or alteration of the cross section of a fiber is preferably achieved by etching. For this purpose fitting length 32 of each fiber 12, 14, 16 and 18 is dipped in an etching solution for a predetermined period of time. A suitable etching solution for etching fibers is HF, but it is understood that any other suitable solution known in the art may be used. The etching solution removes cladding 30 uniformly and thus reduces the radius of the fiber. When the desired radius is obtained each fiber 12, 14, 16 and 18 is removed from the etching solution and stabilized. Because the etch rate of an etching solution is a very well known and accurately controllable, a person of average skill in the art will recognize that extremely high precision of radii R1, R2, R3 and R4 may be achieved by etching cladding 30. Of course, other methods of removing cladding 30 uniformly or non-uniformly can also be employed to produce adjusted fiber cross sections, as discussed below.

Figure 3:
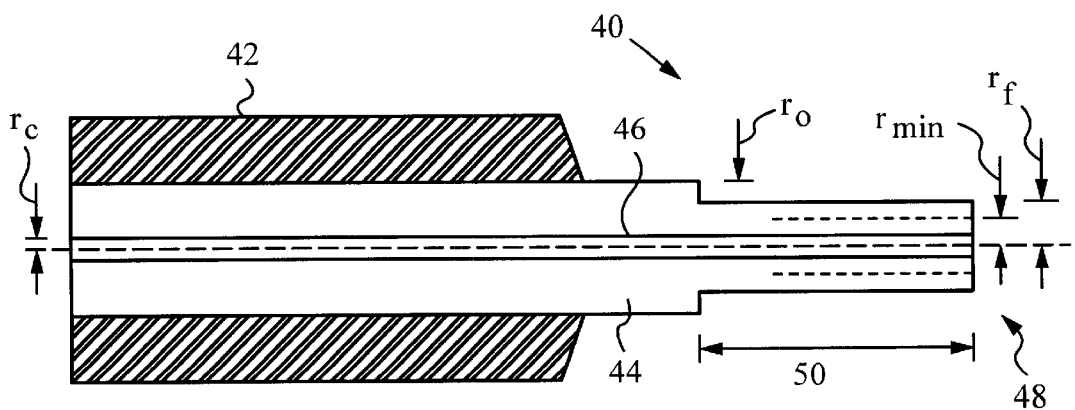
FIG. 3 is cross sectional side view of an optical fiber with a fitting section etched according to the invention.

FIG. 3 illustrates the parameters for etching a fiber 40 in accordance with the invention. Fiber 40 has a jacket 42, a cladding 44 and a core 46. Jacket 42 is removed to expose a portion of cladding 42 up to a tip 48. A fitting length 50 of cladding 42 is uniformly removed by etching to reduce the radius of fiber 40 along fitting length 50. The original radius of exposed portion of fiber 40 is $r_o$ while the final radius of fiber 40 in fitting length 50 is $r_f$.

In this example, fiber 40 is a typical optical fiber with an original radius $r_o$ equal to 125 $\mu$m and a radius $r_c$ of core 46 equal to 10 $\mu$m. Thus, cladding 44 can be etched to a radius of 10 $\mu$m before exposing core 46. In order to prevent mechanical weakness and losses of light from core 46 (e.g., evanescent wave out-coupling into cladding 44) the maximum amount of etching should not remove cladding 44 beyond a minimum radius $r_{min}$. A person of average skill in the art will realize, that the value of $r_{min}$ depends on the mechanical strength of cladding 44, the difference in the refractive index between cladding 44 and core 46, as well as some other well-known parameters such as signal wavelengths carried by core 46, fiber cut-off wavelengths and core radius $r_c$. For example, in a typical single-mode fiber at 1550 nm communication window $r_{min}$ is about four times core radius $r_c$, i.e., about 40 $\mu$m. Hence, final radius $r_f$ of fiber 40 can be adjusted between $r_o$ and $r_{min}$. It is preferable for the purposes of this invention to use fibers with a large difference between $r_o$ and $r_{min}$.

In the embodiment of FIG. 2 fibers 12, 14, 16 and 18 are processed in a manner analogous to that described for exemplary fiber 40 to yield radii R1, R2, R3 and R4. Furthermore, fibers 12, 14, 16 and 18 are arranged in such a way that each one is wedged firmly inside bore 20. Distance d1 between fiber 12 and optical axis 36, as well as second distance d2 are indicated. Distances d1 and d2 add up to total distance D1 separating cores 28 of fibers 12 and 16. Cores 28 of fibers 14 and 18 are separated by a distance D2. Distances d'1 and d'2 indicate the distances between cores 28 of fibers 14 and 18 and optical axis 36, respectively.

In the present embodiment bore 20 has a square cross section at coupling output 26. The length of a side of coupling output 26 is equal to S. Thus, radii R1, R2, R3 and R4 add up pair-wise to S. This ensures that fibers 12, 14, 16 and 18 are firmly wedged in bore 20 by being firmly pressed against each other and against the wall of bore 20. Preferably, fitting length 36 of bore 20 has the same cross section as coupling output 26. The flaring or widening out of bore 20 to insertion opening 24 (see FIG. 1) occurs past fitting length 36.

Distances D1 and D2 are determined from standard geometrical principles. Length S, radii R1, R2, R3 and R4 are known, and it is also known that each fiber is wedged between adjacent fibers and the wall of bore 20. Hence, one can use the Pythagorean Theorem to write the following equation:

$$s=\sqrt{(R3+R2)^2-(R3-R2)^2}+R3+R2.$$

The square root expression is a length Z, or the vertical separation between cores 28 of fibers 14 and 16. This equation relates radii R3 and R2 of fibers 14 and 16 to length S. From this equation distances D1 and D2 can be obtained in a straightforward manner. In the case of square bore 20 fitted with four fibers the relationships R4=R3 and R1=R2 have to be maintained to ensure that all fibers are firmly wedged. In other circumstances such as when using fewer or more fibers and/or when the bore has a different cross section, other relationships between the radii will be dictated by the geometry and the constraint that the fibers have to be firmly wedged in the bore. A person of average skill in the art will realize that standard rules of geometry can be applied to derive those relationships.

In practice, it is convenient to construct a table of radii with the corresponding values of D1, D2 and d1, d2, d'1, d'2. The appropriate radii are then chosen in advance to obtain the desired core offsets from optical axis 36.

Although fibers 12, 14, 16 and 18 are firmly wedged in bore 20 along fitting length 32, it is preferable to pot them in an epoxy 38. This is achieved by pouring epoxy 38 into bore 20 through insertion opening 24 once fibers 12, 14, 16 and 18 are properly wedged in bore 20. Epoxy 38 can be a thermally cured epoxy. In this case, epoxy 38 is cured once it is made certain that it has penetrated all regions between fibers 12, 14, 16 and 18 and the walls of bore 20. Of course, a person of average skill in the art will recognize that it is possible to employ many other methods of potting fibers 12, 14, 16 and 18.

Optical terminal 10 achieves very precise control of the offset distance between cores 28 and optical axis 36. Hence, the output angles of light beams issuing from fibers 12, 14, 16, 18 and passing through GRIN lens 34 can be very precisely controlled. The construction of terminal 10 is simple and insertion of fibers 12, 14, 16, 18 once etched along fitting length 32 to yield the calculated radii is straightforward. Offset tolerances of ÷1 $\mu$m can be easily achieved.

A person of average skill in the art will realize that the optical terminal of the invention can take advantage of capillaries with various types of bores. Also, not all of the fibers inserted into the bore need be active optical fiber; some can be reinforcing fibers used to properly wedge the optical fibers in the bore.

Figure 4A:
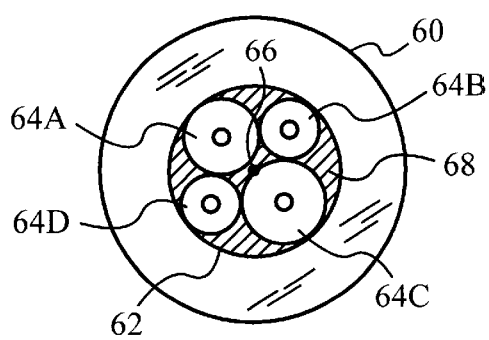
FIGS 4A–F are diagrams illustrating various possible arrangements of fibers in the coupling openings of different bores according to the invention.

FIGS. 4A–F illustrate a few of the alternative capillaries fitted with appropriate fibers in accordance with the invention. In FIG. 4A a capillary 60 with a circular bore 62 holds four optical fibers 64A, 64B, 64C and 64D. The cross sections of fibers 64A, 64B, 64C and 64D are altered or adjusted. In particular, the claddings of fibers 64A, 64B, 64C and 64D have been etched uniformly to obtain calculated final radii. Fibers 64A, 64B, 64C, 64D are wedged into bore 62 and their radii ensure that their light-guiding cores are at precisely calculated distances from an optical axis 66. An epoxy 68 fills the interstices between the fibers and the walls of bore 62.

Figure 4B:
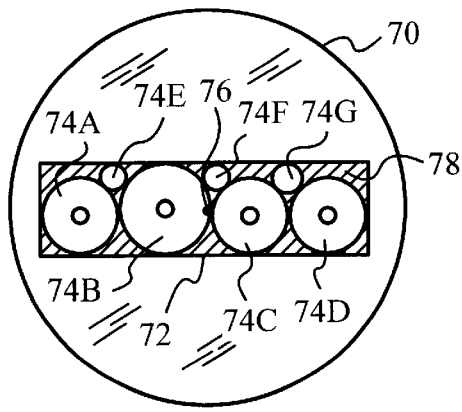

FIG. 4B shows a capillary 70 with a rectangular bore 72. Four optical fibers 74A, 74B, 74C and 74D are wedged into bore 72 with the aid of three reinforcing fibers 74E, 74F and 74G. All fibers 74A, 74B, 74C, 74D, 74E, 74F and 74G have individually adjusted radii to ensure proper offsets between the cores of optical fibers 74A, 74B, 74C, 74D and an optical axis 76. An epoxy 78 fills the interstices between the fibers and the walls of bore 72.

Figure 4C:
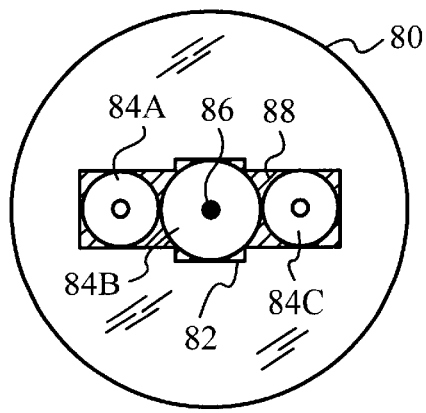

FIG. 4C shows a capillary 80 with a bore 82. Three optical fibers 84A, 84B and 84C having circular cross sections are wedged in bore 82. Fiber 84B has the largest radius and is accommodated in a widened central portion 83 of bore 82. Fibers 84A and 84C are wedged into bore 82 on either side of fiber 84B. In this embodiment the cross section of bore 82 is used in conjunction with adjusting the radii of optical fibers 84A, 84B and 84C to ensure proper offsets between the cores of optical fibers 84A, 84B, 84C and an optical axis 86. All fibers are potted in an epoxy 88.

Figure 4D:
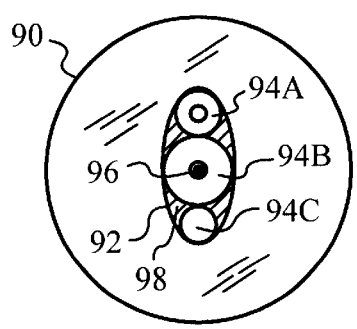

FIG. 4D shows a capillary 90 with an oval bore 92 for wedging two optical fibers 94A, 94B and a reinforcement fiber 94C. Proper offset of the optical fiber cores from an optical axis 96 is ensured by selecting the appropriate radii of fibers 94A, 94B and 94C. An epoxy 98 is used for potting the fibers in bore 92.

Figure 4E:
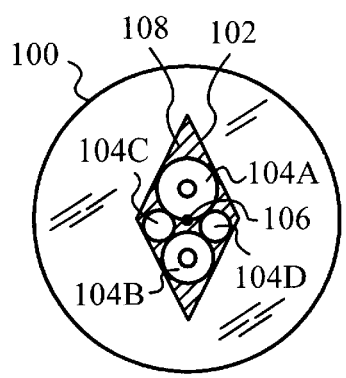
Figure 4F:
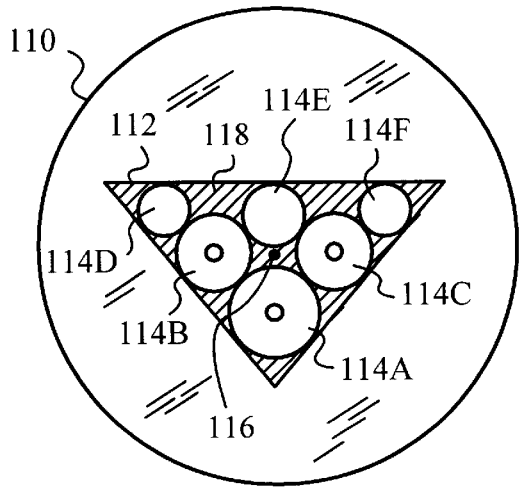

FIGS. 4E and 4F illustrate capillaries 100, 110 with bores 102 and 112. Optical and reinforcement fibers (104A, 104B, 104C, 104D and 114A, 114B, 114C, 114D, 114E, 114F) of various radii are used in both cases to achieve the desired offsets between the optical fiber cores and optical axes 106 and 116, respectively. Both embodiments use epoxies 108 and 118 for potting optical and reinforcement fibers in bores 102 and 112 respectively.

In the embodiments of FIGS. 4A–F the relationships between the radii of the optical and/or reinforcement fibers and bore geometry differ. Each embodiment requires that offsets of optical fiber cores from the optical axis be calculated taking into account the bore geometry and corresponding radii values. A person of average skill in the art will recognize that well-known principles of Euclidean geometry are sufficient to perform those computations in any particular case.

It is also possible make an optical terminal according to the invention with non-circular optical fibers. Two examples of embodiments employing fibers whose adjusted cross sections are non-circular are shown in FIGS. 5A–B.

FIG. 5A illustrates a capillary 120 with a circular bore 122. Two optical fibers 124A, 124B having an adjusted elliptical cross section are wedged into bore 122. Two additional optical fibers 125A, 125B having circular cross sections described by corresponding radius values are wedged between optical fibers 124A, 124B and the wall of bore 122. The spacing of the optical fiber cores from an optical axis 126 is determined by the cross sections of all optical fibers 124A, 124B, 125A, 125B in accordance with principles of Euclidean geometry.

In FIG. 5B a capillary 130 with a rectangular bore 132 accommodates two optical fibers 134A, 134B with elliptical cross sections. Although no reinforcement fibers are shown in the embodiments of FIGS. 5A–B, circular and non-circular reinforcement fibers can be used as required. Also, non-elliptical fiber cross sections can also be used. Adjustment of fiber cross section does not necessarily have to be performed by etching. Other suitable high-precision attrition techniques can also be employed. In addition, the cross sections of the fibers can be tapered, e.g., to exhibit a taper along a portion of the fitting length near the tip, if necessary.

FIG. 6 shows a portion of an optical terminal 150 for two optical fibers 152, 154 according to the invention. Terminal 150 has a capillary 156 with a bore 158 commencing at a wide insertion opening 160 and terminating at a coupling opening 162. A GRIN lens 164 is attached directly to capillary 156 on the side of coupling opening 162. GR1N lens 164 has an optical axis 166.

Optical fibers 152, 154 have jackets 168A, 168B, claddings 170A, 170B and cores 172A, 172B. Jackets 168A, 168B are stripped up to insertion opening 160. Fiber 152 has an etched fitting length L1+L2, while fiber 154 has a slightly etched fitting length L2. L2 corresponds to the length of bore 158 which has the same cross section as coupling opening 162. Fibers 152, 154 are inserted into bore 158 until their tips 174A, 174B abut against GRIN lens 164. Then, an epoxy 176 is poured into bore 158 and cured.

At tips 174A, 174B the distances between cores 172A, 172B and optical axis 166 are d1 and d2 respectively. Consequently, light beams issuing form fibers 152, 154 will have different output angles from GRIN lens 164.

Figure 7:
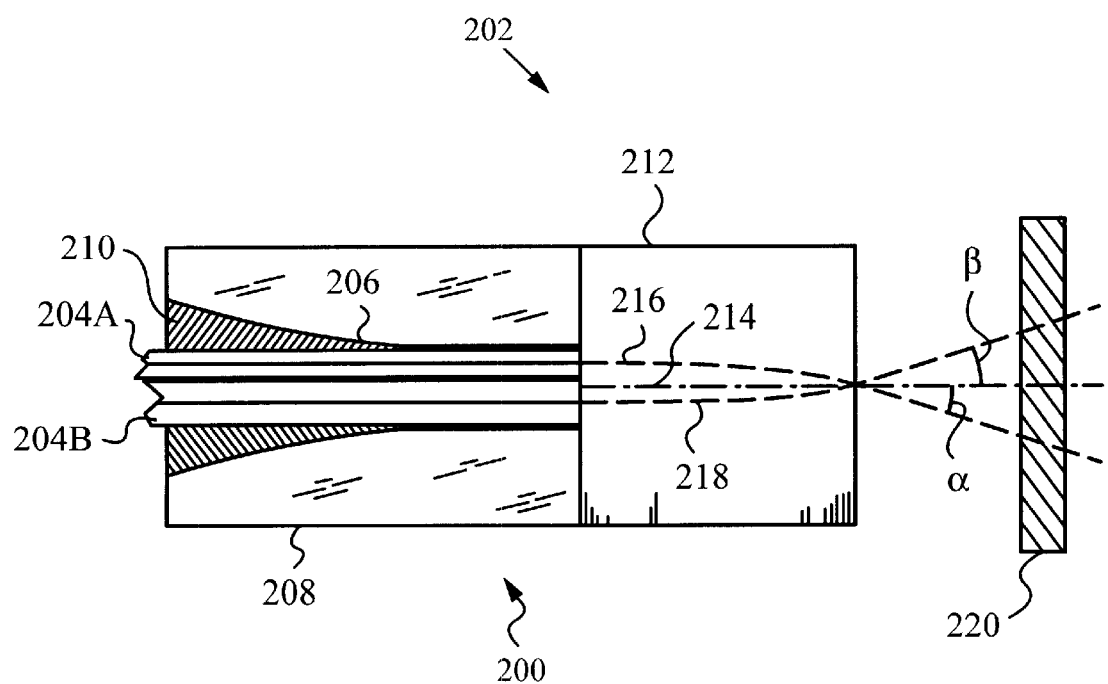
FIG. 7 is a cross sectional side view of an optical terminal according to the invention used in a wavelength filter.

FIG. 7 illustrates how an optical terminal 200 is employed in a wavelength filter 202. Terminal 200 holds two optical fibers 204A, 204B wedged in bore 206 of a capillary 208. An epoxy 210 helps to protect and keep fibers 204A, 204B firmly in place. A GRIN lens 212 is positioned in front of capillary 208. GRIN lens 212 has an optical axis 214. The cores of fibers 204A, 204B are offset by different distances from axis 214.

Beams 216, 218 emitted from fibers 204A, 204B exit GRIN lens 212 at two different output angles $\alpha$, $\beta$. Hence, they are incident on a filter 220 at incidence angles $\alpha$, $\beta$. The center frequency or wavelength transmitted by filter 220 varies with the angle of incidence. Thus, the wavelength transmitted for beam 216 incident at angle $\alpha$ is different from the wavelength transmitted for beam 218 incident at angle $\beta$. In typical wavelength filters used in WDM a 2° change in the angle of incidence from normal incidence will cause a 0.35 nm shift in the center transmitted wavelength. Thus, the high precision with which angles $\alpha$ and $\beta$ are set in optical terminal 200 ensures that very high control over the transmission wavelengths can be achieved.

More importantly, by using different angles of incidence from the same fiber terminal, one filter can be used to transmit signals at two or more different wavelengths. This is of particular interest in DWDM optical communications.

Accordingly, the scope of the invention should be determined by the following claims and their legal equivalents.

What is claimed is:

1. An optical terminal comprising:
   a) a capillary having a bore therethrough, said bore having an insertion opening and a coupling opening;
   b) a light-guiding element positioned in front of said coupling opening, said light-guiding element having an optical axis;
   c) a first optical fiber having a first tip, a first core for conducting a light beam and a first cladding surrounding said core, said first optical fiber having a first fitting length along which a portion of said first cladding is removed to produce a first adjusted cross section, and said first optical fiber being located in said bore such that said first tip is positioned at said coupling opening; and
   d) a second fiber having a second fitting length having a second adjusted cross section different from said first adjusted cross section, said second fiber being located in said bore such that said first fitting length is wedged in said bore and said first core at said first tip is maintained at a first distance from said optical axis.

2. The optical terminal of claim 1, wherein said bore is larger at said insertion opening than at said coupling opening.

3. The optical terminal of claim 1, wherein said first adjusted cross section is circular.

4. The optical terminal of claim 1, wherein said coupling opening has a rectangular cross section.

5. The optical terminal of claim 1, wherein said coupling opening has a circular cross section.

6. The optical terminal of claim 1, wherein said light-guiding element is selected from the group consisting of GRIN lenses, ball lenses and micro-drum lenses.

7. The optical terminal of claim 1, wherein said second fiber is a second optical fiber having a second core and a second cladding, and said second adjusted cross section comprises a removed portion of said second cladding along said second fitting length.

8. The optical terminal of claim 7, wherein said second optical fiber has a second tip positioned at said coupling opening such that said second fitting length is wedged in said bore and said second core at said second tip is maintained at a second distance from said optical axis.

9. The optical terminal of claim 7, wherein said second fitting length is equal to said first fitting length.

10. The optical terminal of claim 1, wherein said second fiber is a reinforcing fiber.

11. The optical terminal of claim 1, wherein said bore is filled with an epoxy in the regions between said bore and said first optical fiber and said second fiber.

12. A method for controlling an output angle of a light beam from a first tip of a first optical fiber, said first optical fiber having a first core for conducting said beam and a first cladding surrounding said core, said method comprising the following steps:

a) removing a portion of said first cladding along a first fitting length of said first optical fiber such that said first optical fiber has a first adjusted cross section along said first fitting length;

b) providing a capillary having a bore therethrough, said bore having an insertion opening and a coupling opening;

c) positioning a light-guiding element having an optical axis in front of said coupling opening;

d) inserting said first optical fiber into said bore through said insertion opening such that said first tip is positioned at said coupling opening; and e) providing a second fiber having a second cladding;

f) removing said second cladding along a second fitting length of said second fiber such that said second fiber has a second adjusted cross section different from said first adjusted cross section along said second fitting length; and g) inserting said second fiber into said bore through said insertion opening such that said first fitting length is wedged in said bore and said first core at said first tip is maintained at a first distance from said optical axis.

13. The method of claim 12, wherein said step of removing a portion of said first cladding is performed by etching.

14. The method of claim 13, wherein said etching comprises uniform removal of said portion of said cladding such that said first adjusted cross section is circular.

15. The method of claim 13, wherein said etching is performed to within four times the radius of said first core.

16. The method of claim 12, wherein said second fiber is a second optical fiber having a second core.

17. The method of claim 16, wherein said second optical fiber has a second tip and said insertion step is performed such that said second tip is positioned at said coupling opening, and such that said second fitting length is wedged in said bore and said second core at said second tip is maintained at a second distance from said optical axis.

18. The method of claim 16, wherein said second fitting length is selected equal to said first fitting length.

19. The method of claim 12, wherein said second fiber is a reinforcing fiber.

20. The method of claim 12, further comprising the step of inserting a third fiber into said bore through said insertion opening.

21. The method of claim 12, wherein said light-guiding element is selected from the group consisting of GRIN lenses, ball lenses and micro-drum lenses.

22. The method of claim 12, further comprising the step of pouring an epoxy into said bore through said insertion opening.

* * * * *